UNITED STATES PATENT OFFICE.

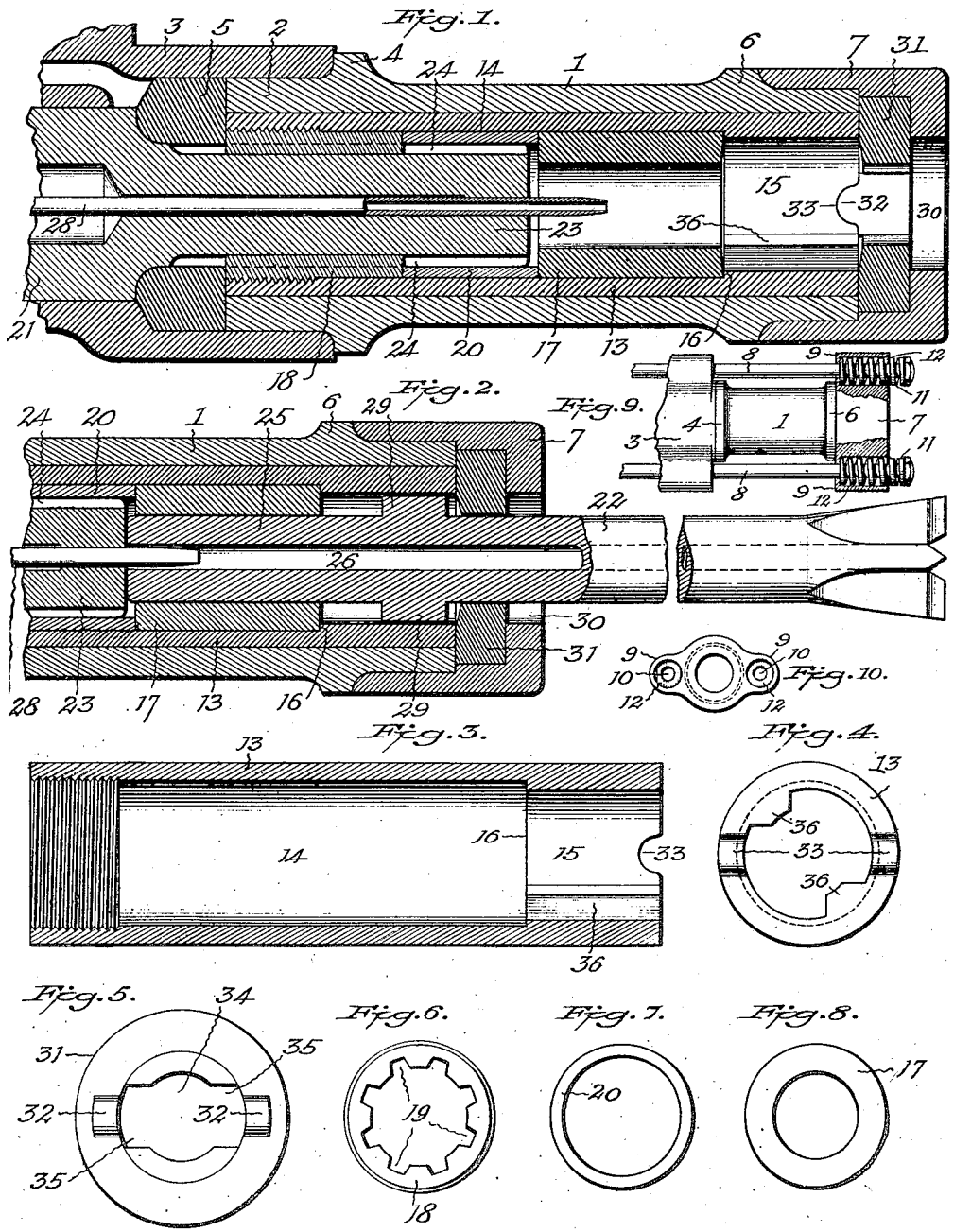

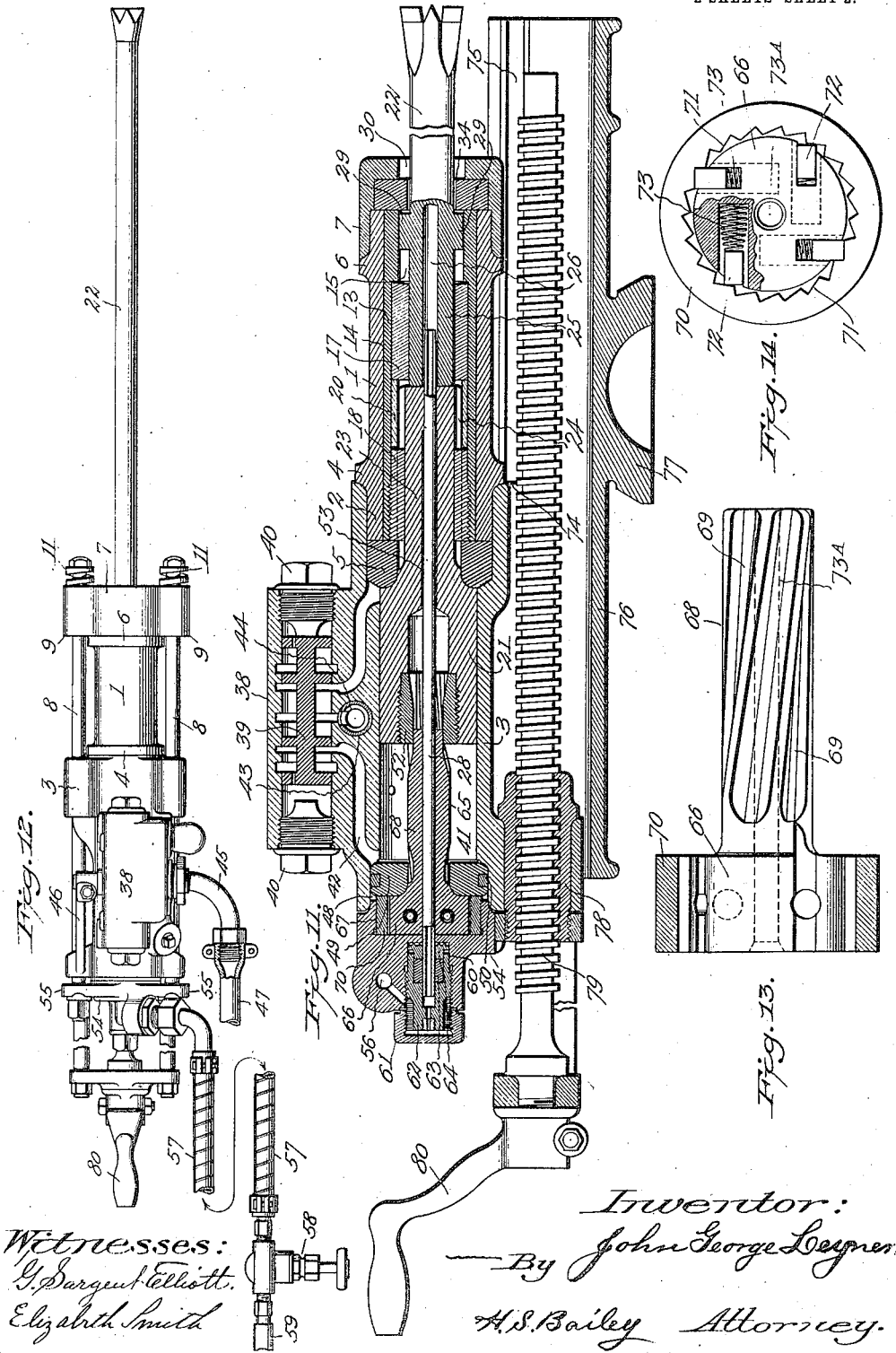

JOHN GEORGE LEYNER, OF DENVER, COLORADO.

COMBINED DRILL-BIT-HOLDING CHUCK AND FRONT CYLINDER-HEAD FOR ROCK-DRILLING ENGINES.

1,124,627. Specification of Letters Patent. Patented Jan. 12, 1915.

Application filed August 15, 1911. Serial No. 644,152.

*To all whom it may concern:*

Be it known that I, JOHN GEORGE LEYNER, a citizen of the United States of America, residing in the city and county of Denver and State of Colorado, have invented a new and useful Combined Drill-Bit-Holding Chuck and Front Cylinder-Head for Rock-Drilling Engines, of which the following is a specification.

My invention relates to improvements in combined drill bit holding chuck and front cylinder heads for rock drilling engines, and the objects of my invention are: first—to provide a combined drill bit holding chuck and front cylinder head, which is adapted to be connected to the cylinders of rock drilling engines by any suitable means, but preferably by yielding connections which give under longitudinal strain, said head being provided with and adapted to support a rotary drill holding chuck which is rotated by the hammer piston of the drilling engine; and second—to provide a tubular front cylinder head for rock drilling engines, adapted to support a hammer piston operated drill bit holding chuck which is adapted to support a rock cutting drill bit in such a manner that it can be instantaneously inserted in and withdrawn from the chuck portion of the front cylinder head by the hand of an operator, and that is arranged to support the drill bit so that an intermittent step by step rotative movement can be imparted to it by the reciprocating movements of the piston hammer and the rifle bar and ratchet toothed mechanism of rock drilling engines. I attain these objects by the mechanism illustrated in the accompanying drawings, in which:

Figure 1 is a longitudinal, sectional view through the combined drill bit holding chuck portion of the front head, the drill bit being omitted. Fig. 2 is a similar view showing the drill bit in the chuck. Fig. 3 is a longitudinal, sectional view of the chuck portion of the front cylinder head. Fig. 4 is an end view of the same. Fig. 5 is a front view of the drill bit locking ring. Fig. 6 is a front view of the fluted chuck nut. Fig. 7 is a front view of the chuck ring. Fig. 8 is a front view of the chuck bushing. Fig. 9 is a fragmentary plan view made on smaller scale than Figs. 1, 2 and 11, and showing the housings of the springs of the side rods in section. Fig. 10 is a front view of the cylinder head cap. Fig. 11 is a longitudinal sectional view of a complete operative rock drilling engine showing the application of my combined drill bit holding chuck and front cylinder head to it. Fig. 12 is a plan view of the drilling engines on a smaller scale than Figs. 1, 2 and 11, showing the water inlet hose connected to the rear cylinder head. Fig. 13 is a side view of the rifle bar, the ratchet ring being shown in section in connection therewith; and Fig. 14 is an end view of the rifle bar and ratchet ring, the rifle bar being partly broken away for clearer illustration.

Similar letters of reference refer to similar parts throughout the several views.

Referring to the drawings: The numeral 1 designates the cylinder head portion of my combined drill bit holding chuck and front cylinder which is adapted as a front cylinder head for the cylinders of rock drilling engines. The rear end portion 2 of this cylinder head portion 1 is adapted to enter the front end portion of a cylinder 3, a fragment of which I illustrate in Fig. 1, to show the coöperative relation of my front cylinder head to it. This cylinder, however, does not form a part of my present invention, but coöperates with it, together with other features which I have illustrated and will describe hereinafter, to make an operative rock drilling engine.

A projecting annular or circumferential lug or collar 4, which is arranged to form a shoulder, is formed around the cylinder head adjacent to its rear end 2, which is adapted to bear against the end of a cylinder, while the extreme rear end extends into the rear end of the cylinder and extends to a cylinder ring 5. This front cylinder head is in the form of a tubular shaped casing, and adjacent to its front end portion an annular projecting lug or collar portion 6 is formed. A cap 7 extends over the front end of the cylinder head against this lug. The cap may be secured to the end of the cylinder by any suitable means, but I preferably use side bolts 8, as shown in Fig. 9, which extend through two oppositely arranged and projecting side lugs 9, which are provided with apertures 10, through which the bolts pass to the cylinder, as shown in Fig. 10; but my invention contemplates any suitable means for securing the cylinder head to the cylinder, and also any suitable way of securing the cap to the end of the cylinder.

The ends of the bolts extend beyond the cap and an expansive spring 11 is mounted on each bolt between the head of the bolt and the side lug of the cap, which is provided with recesses 12, into which the springs extend, and they bear against the bottom wall of the recesses in the cap, as shown in Fig. 9. These side bolts extend along the sides of the cylinder to its opposite end or head, and they clamp the front cylinder head to the cylinder and at the same time clamp the cap to the front end of the front cylinder head with a resilient clamping pressure. This front cylinder head is provided with a straight cylindrical bore in which a sleeve 13 is rotatably mounted. This sleeve 13 I term the chuck sleeve. This chuck sleeve is provided with an axial bore of two different diameters, which are both arranged in axial alinement with the bore of the hammer piston cylinder.

The larger axial bore 14 extends from the rear end of the chuck sleeve to within a short distance of its front end, where it terminates in a smaller bore 15, and a shoulder 16 is formed at the junction of these two bores. A bushing 17, which I term the chuck bushing, fits tightly in the bore 14 of the chuck sleeve and is seated against the shoulder 16, and while I have illustrated this bushing as being entirely separate and independent from the sleeve 13, it can be made integral with the sleeve if desired, but facilitates the assembling and taking apart of the chuck when made separate from the sleeve.

The entrance to the rear end of the chuck sleeve is threaded, and a nut 18, which I term a chuck nut, is threaded to it. This nut 18 is provided with an axial bore in the wall of which straight rifle flutes 19 are formed. A ring 20, which I term the chuck ring, is placed in the bore 14, between the chuck nut and the chuck bushing 17. This form of cylinder head and chuck is adapted to a hammer piston 21 for driving the rock cutting drill bit 22, and this hammer piston is provided with an extension 23, which I term the hammer bar extension, the surface of which is provided with straight rifled flutes 24, which are arranged and adapted to fit reciprocally in the straight rifled flutes of the chuck nut 18.

The axial aperture through the chuck ring 20 is enough larger than the end of the hammer piston bar to extend loosely around its end which extends through the chuck nut in it to close to the adjacent end of the chuck bushing sleeve 17, but does not strike it, as the shoulder at the junction of the hammer bar and the piston head portion of the hammer piston is rounded and is arranged to strike against the front cylinder ring 5, the corner of which is also rounded.

My improved cylinder head and its chuck is arranged and adapted to hold and to drive rock cutting drill bits of different length and sizes and of any suitable type or character and arrangement of rock cutting lips, and my invention contemplates the use of a drill bit holding chuck adapted to receive and to hold a drill bit in such a position in the reciprocal path of the hammer piston that it will be driven thereby to operatively drill holes in rock when properly positioned in operative relation thereto. I preferably, however, use the type and character of drill bit 22, illustrated in Figs. 2 and 11. This drill bit comprises a shank portion 25, which is provided with an axial aperture 26, which extends through it from end to end. This aperture 26 is made large enough to permit the shank end 25 of the drill bit to fit loosely over the forward end of a water conveying inlet tube 28, which projects through the hammer piston from the rear end of a drilling engine.

The drill bit is provided at a short distance from its shank end with a pair of projecting lugs 29, which I term locking lugs. These lugs are formed on diametrically opposite sides of the shank end of the drill bit and are arranged and adapted to form shouldered portions on the shank that are used in connection with the chuck ring to secure the drill bit to the drilling engine.

I preferably arrange the drill bit holding chuck portion of my front cylinder head in the following manner: The front end of the cap 7 is provided with an axial aperture 30, which is made large enough to permit the shank ends of rock cutting drill bits to be inserted loosely into and through it into a ring 31, which I term the key ring. This key ring is placed within the cap between its end head and the end of the sleeve 13, and it is keyed loosely against rotative movement to the end of the sleeve by projecting lugs 32, that are formed on the key ring and are adapted to fit into recesses 33 formed in the adjacent end of the sleeve to receive them. The key ring 31 is thus removably secured to the end of the chuck sleeve within the cap of the front cylinder head, but so as to rotate with said sleeve. This key ring 31 comprises a hardened steel ring that is provided with a central axial aperture 34, which is large enough in diameter to permit the shank end of the drill bit to fit loosely in it. This central aperture is extended on two of its opposite side portions by straight lateral slot portions 35, which extend far enough beyond the diameter of the central round portion to permit the lugs 29 of the shank of the drill bit to pass loosely through them.

The bore 15 of the sleeve 13 is provided on opposite sides with inwardly projecting lugs or key portions 36, which are adapted to engage the lugs 29 of the drill bit, when the said bit is inserted through the key ring and given a partial turn, as upon turning the drill bit after entering it through the key ring into the aperture in the end of the chuck sleeve, the lugs 29 engage the sides of the lug keys 36, and the drill bit is locked against rotation in one direction, and the rotative movement of the chuck sleeve in the opposite direction holds the drill bit lugs against these lug keys 36 and out of alinement with the entrance aperture in the key ring, and thus prevents the drill bit from working accidentally out of the chuck, and it can only be withdrawn therefrom by turning it so its lugs are in alinement with the lug receiving apertures of the key ring.

The lugs 29 of the drill bit have a longitudinal movement on the lug keys of the sleeve, of preferably about three-quarters of an inch, while the terminal end of the shank of the drill extends beyond that portion of the chuck sleeve in which the lugs are held into and through the front bushing and into the reciprocal path of the hammer piston to receive the full force of the reciprocal blows of the hammer piston and still have a compensating feed movement forward into rock when the feed screw is rotated to hold the drill bit against the rock in the lug holding portion of the chuck of about three-quarters of an inch.

In Fig. 11 I have illustrated my improved combined drill bit holding chuck and cylinder head operatively connected to a rock drilling engine such as is embodied in my pending application No. 570,339, filed July 5, 1910.

The rock drilling engine illustrated in Fig. 11, shows a rock drilling engine in which air and water are commingled together and fed to the rock cutting point of the drill bit, and it consists of a number of elements that do not form a part of my present invention, but they coöperate with my present invention to form a complete rock drilling engine, but as these features are fully described in that application, they will be only briefly referred to in this application. These features consist of the cylinder 3, which is provided with a valve chest 38, in which a valve 39 is reciprocally mounted. The opposite ends of the valve chest are provided with removable plugs 40. The cylinder is provided with a suitable bore 41, and an operative system of ports 42 is formed in the walls of the cylinder and valve chest.

A compressed air or other actuating fluid inlet aperture 43, is formed in the cylinder in which a valve 44, is operatively seated. A swiveling air inlet elbow 45, is threadedly secured to the opposite side of the air inlet aperture from the handle 46, of the inlet valve 44, which is arranged to be connected to one end of a hose 47, only a fragment of which is shown, but which is adapted to extend to a supply of compressed air or other suitable actuating fluid.

The cylinder is provided with a counterbore 48, at its rear end, in which a ring 49, which I term a cylinder ring, is seated. This cylinder ring is provided in its periphery with a packing ring 50, to prevent leakage of air past the cylinder ring from the bore of the cylinder.

The piston hammer 21, is reciprocally mounted in the bore of the cylinder and its rear end is provided with an axial aperture, in which a spirally fluted nut 52, is secured. A smaller axial aperture 53 is also formed entirely through the piston hammer, through which the water feeding tube 28, extends, as will be fully explained hereinafter. The cylinder is provided with a rear cylinder head 54, which, together with the front cylinder head, is clamped to the opposite ends of the cylinder by resilient tension bolts 8, which extend through projecting portions 9 and 55, and are provided with springs 11, as shown in Fig. 9, these bolts being arranged in an operative manner to clamp the cylinder heads and the cylinder together. The rear cylinder head 54, is provided with a water inlet aperture 56, to which one end of a short piece of hose 57, is attached and in which a valve 58, is placed adjacent to its opposite end, which is provided with a hose coupling end that is adapted to be coupled to a piece of hose 59, which I do not illustrate, but which leads to a supply of water under pressure enough to flow through the drilling engine to the rock cutting point of the drill bit.

The water inlet aperture 56 in the rear cylinder head connects with an axial aperture 60, that extends into the rear cylinder head and closed by a cap 61. The axial bore in the rear cylinder head is provided with parts 62, 63 and 64, which are provided, together with the rear cylinder head, with axial apertures into which one end of the water conveying tube 28, projects, and the parts 62, 63 and 64 are arranged to clampingly hold the end of the pipe 28, in a rigid but releasable position in the axial center of the rear cylinder head, from which it projects, and it is arranged to extend loosely through the axial center of the rifle bar 65 and loosely through the axial aperture 53, in the piston hammer 21, into the shank end of the hollow drill bit 22.

The rifle bar comprises a head portion 66, that fits rotatably in a ring mounted in a counterbore 67, formed in the rear cylinder head, and a stem portion 68, that projects from the head portion through the cylinder ring 49 into the bore of the cylinder. The stem portion of the rifle bar is provided with spirally arranged rifle flutes 69, that are arranged to mesh loosely into and slide freely in the fluted nut of the piston hammer, into the axial bore of which the rifle bar extends from the rear cylinder head; the piston hammer being arranged to reciprocate freely on the spiral flutes of the rifle bar.

The head portion 66 of the rifle bar is surrounded by a ratchet toothed ring 70, the inner peripheral surface of which is provided with a circumferential row of ratchet teeth 71. This ring is rotatively seated in the counter-bore 67, but is held under a frictional clamping pressure between the bottom of the counterbore and the adjacent side of the cylinder ring 49, by the resilient tension of the side bolts 8.

The head 66 of the rifle bar is provided with a plurality of spring pawl dogs 72, the springs 73 of which hold the pawls in operative engaging relation to the teeth of the ratchet ring. This ratchet ring and the rifle bar are shown in Figs. 13 and 14.

The rifle bar is provided with an axial aperture 73$^A$, which is made enough larger in diameter than the water conveying tube 28, to permit the rifle bar to rotate freely on the water conveying tube which projects from the rear cylinder head loosely through it.

The cylinder is provided with slideways 74, and is slidably mounted in guideways 75, formed in a shell 76, which is provided with a hub 77, that is adapted to be clamped by a chuck to a mine column. I do not illustrate this chuck or the mine column, as they do not form a part of my present invention. The cylinder is also provided with a depending nut portion 78, which is threaded, and a feed screw 79 is rotatably mounted on the shell and is threaded to the nut in such a manner that when the feed screw is turned by a crank handle 80, with which it is provided, the cylinder is fed slidably forward or backward in the guideways of the shell.

The general operation of the drilling engine is as follows: Compressed air is admitted to the valve chest and valve by the inlet valve and reciprocates the hammer piston, which strikes against the end of the drill bit. The reciprocating strokes of the hammer piston on the rifle bar and in the nut 18 of the chuck sleeve 13, impart through the medium of the pawls and ratchet ring, a step by step rotary movement to the drill bit. Water is turned into the rear cylinder head through the water inlet valve 58, and flows through the tube 28, onto the end of the hollow drill bit where air from the cylinder which also enters the end of the drill bit, mingles with it and discharges as a jet or spray from the end of the drill bit, into the bottom of holes in rock while drilling them.

While I have illustrated my improved combined drill bit holding chuck and front cylinder head attached to a particular type of rock drilling engine, I do not wish to be limited to the application of it to that type of drilling engine, and furthermore I do not wish to be limited to the exact construction of the drill holding chuck and cylinder head shown, as many changes might be made without departing from the spirit of my invention and the scope of the appended claim.

Having described my invention, what I claim as new and desire to secure by Letters Patent is:

In a rock drilling-engine, a cylinder, a combined drill-bit holding-chuck and front cylinder-head, a cylindrical casing and a cap portion, resiliently yielding side bolts for securing said cap and casing to the cylinder, a sleeve mounted in said casing, a ring keyed to said sleeve and rotatably positioned between said sleeve and said cap, said sleeve being provided with a clearance space adjacent to said ring, adapted to receive the locking lugs of a drill bit, and provided with introverted key portions, said ring being provided with a drill bit entrance aperture arranged at a cross angle to said sleeve's key portion, said drill bit being provided with a shank end portion adapted to fit loosely in said sleeve, and with projecting locking lugs adapted to pass freely through said ring and abut against the key portions of said sleeve, and a bushing in said sleeve arranged to define the clearance movement of said drill bit's locking lugs in the clearance space of said sleeve.

In testimony whereof I affix my signature in presence of two witnesses.

JOHN GEORGE LEYNER.

Witnesses:
G. SARGENT ELLIOTT,
ELIZABETH SMITH.